United States Patent
Meli et al.

(10) Patent No.: US 6,646,786 B1
(45) Date of Patent: Nov. 11, 2003

(54) COPROPAGATING RAMAN PUMP UNIT TO SUPPRESS FOUR-WAVE MIXING CROSSTALK BETWEEN PUMP MODES AND WDM SIGNALS

(75) Inventors: Fausto Meli, Piacenza (IT); Fabrizio Di Pasquale, Pisa (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/139,467

(22) Filed: May 6, 2002

(51) Int. Cl.$^7$ ................................................ H01S 3/00
(52) U.S. Cl. ........................................ 359/334; 359/337
(58) Field of Search .............................. 359/334, 341.3, 359/337

(56) References Cited

U.S. PATENT DOCUMENTS

| | | | |
|---|---|---|---|
| 6,181,464 B1 | 1/2001 | Kidorf et al. | 359/134 |
| 6,191,877 B1 | 2/2001 | Chraplyvy et al. | 359/124 |
| 6,239,902 B1 | 5/2001 | Islam et al. | 359/124 |
| 6,344,922 B1 | 2/2002 | Grubb et al. | 359/134 |
| 6,356,383 B1 | 3/2002 | Cornwell, Jr. et al. | 359/334 |
| 6,384,963 B2 | 5/2002 | Ackerman et al. | 359/334 |
| 6,417,958 B1 | 7/2002 | Du et al. | 359/334 |
| 6,424,455 B1 | 7/2002 | Dmitri | 359/334 |
| 6,433,921 B1 | 8/2002 | Wu et al. | 359/334 |
| 6,441,950 B1 | 8/2002 | Chen et al. | 359/334 |
| 6,519,079 B1 * | 2/2003 | Grochocinski et al. | 359/337 |
| 2002/0021864 A1 | 2/2002 | Emori et al. | 385/27 |
| 2003/0108315 A1 * | 6/2003 | Kubo et al. | 385/123 |

FOREIGN PATENT DOCUMENTS

| | | | |
|---|---|---|---|
| EP | 1239558 A2 * | 9/2002 | |
| JP | 2000214503 A * | 8/2000 | |

OTHER PUBLICATIONS

M. Eiselt, et al. "Optical SNR Versus Q–Factor Improvement with Distributed Raman Amplication in Long Amplifier Chains," 2000 ECOC Proc., vol. 3 pp 77–78.

F. Forghieri, et al. "Bandwidth of cross talk in Raman amplifiers," 1994 OFC Optical Fiber Communication, Technical Digest, vol. 4 pp. 294–295.

I, Kaminow, et al. "Fiber Nonlinearities and Their Impact on Transmission Systems," 1997 Optical Fiber Telecommunications IIIA, Chapter 8 pp. 196–264.

K. Mochizuki, "Amplified Spontaneous Raman Scattering in Fiber Raman Amplifiers," 1986 IEEE vol. LT–4, No. 9 pp. 1328–1333.

(List continued on next page.)

*Primary Examiner*—Mark Hellner
(74) *Attorney, Agent, or Firm*—Ritter, Lang & Kaplan LLP

(57) ABSTRACT

Four-wave mixing crosstalk between co-propagating Raman amplification pump sources and WDM channels is suppressed. Therefore, co-propagating pumping may be applied to Raman amplification without incurring penalties due to four-wave mixing crosstalk. Pump power need not be substantially increased to accommodate use of the present invention. Also, the use of lower cost Fabry-Perot pump sources is facilitated. In one implementation, the advantageous suppression of four-wave mixing crosstalk between pump signals and WDM channels is accomplished by imposing chromatic dispersion on the co-propagating pump sources.

24 Claims, 10 Drawing Sheets

Dotted line indicates repetition of spans

OTHER PUBLICATIONS

T. N. Nielsen, et al. "3.28–Tb/s Transmission Over 3 ×100 km of Nonzero–Dispersion Fiber Using Dual C– and L–Band Distributed Raman Amplification," 2000 IEEE Photonics Technology Letters, vol. 12, No. 8 pp. 1079–1081.

S. Radic, et al. "Signal Impairment due to Four–Wave Mixing in L–Band EDFAs," 1999 Proc. ECOC.

H. Suzuki, et al. "1–Tb/s (100×10 Gb/s) Super–Dense WDM Transmission with 25–GHz Channel Spacing in the Zero–Dispersion Region Employing Distributed Raman Amplification Technology," 2000 IEEE Photonics Technology Letters, vol. 12, No. 7 pp. 903–905.

Aoki, Yashuhiro. "Properties of Fiber Raman Amplifiers and Their Applicability to Digital Optical Communication System." J. Lightwave Tech. 6:7, Jul. 1998, pp. 1225–1239.

Hansen et al. "Rayleigh Scattering Limitations in Distributed Raman Pre–Amplifiers." Photonics Tech. Lett. 10:1, Jan. 1998, pp. 159–161.

Griseri et al., USSN 60/279,854, "Interaction of Four–Wave Mixing and Distributed Raman Architecture".

Griseri et al., USSN 09/899,872, "Reduced Four–Wave Mixing Raman Amplification Architecture".

* cited by examiner

COPROPAGATING RAMAN PUMP UNIT TO SUPPRESS FOUR-WAVE MIXING CROSSTALK BETWEEN PUMP MODES AND WDM SIGNALS

BACKGROUND OF THE INVENTION

The present invention relates to optical communication systems and more particularly to systems and methods for optical amplification.

Dense wavelength division multiplexing (DWDM) systems are evolving to both increase the distances over which DWDM signals may travel without regeneration and also to expand data carrying capacity by increasing the number of channels. To support this evolution, DWDM amplification technology is increasingly relying on Raman amplifiers including distributed Raman amplifiers (DRAs).

To further enhance the performance of Raman amplification, it is desirable to use both counter-propagating and co-propagating pump signals. See U.S. patent application Ser. No. 09/899,872, the contents of which are herein incorporated by reference in their entirety for all purposes. The use of co-propagating pumping substantially improves OSNR performance. However, the use of co-propagating pumping may also give rise to undesirable effects such as non-linear effects, Raman crosstalk, and RIN pump noise. In particular, four-wave mixing (FWM) crosstalk is a key nonlinear impairment in WDM transmission systems, especially those employing close channel spacing.

With the introduction of co-propagating pumping for Raman amplification, the four-wave mixing products are generated not only by the interaction among the closely spaced WDM channels but also by the interactions between multiple pump modes and WDM signals. Consider that a co-propagating pump source, although ideally narrowly concentrated at a single spectral peak, may actually include several spectral peaks corresponding to different cavity modes. Four-wave mixing interaction can then occur between all WDM channels and WDM pump modes. Depending on fiber chromatic dispersion and pump power, the resulting impairment can make use of co-propagating Raman pumping impractical.

What is needed are systems and methods to obtain the benefits of the use of co-propagating pumping in Raman amplification without incurring intolerable levels of four-wave mixing crosstalk between WDM channels and pump signals.

SUMMARY OF THE INVENTION

By virtue of one embodiment of the present invention, four-wave mixing crosstalk between co-propagating Raman amplification pump sources and WDM channels is suppressed. Therefore, co-propagating pumping may be applied to Raman amplification without incurring penalties due to four-wave mixing crosstalk. Pump power need not be substantially increased to accommodate use of the present invention. Also, the use of lower cost Fabry-Perot pump sources is facilitated. In one implementation, the advantageous suppression of four-wave mixing crosstalk between pump signals and WDM channels is accomplished by imposing chromatic dispersion on the co-propagating pump sources.

A first aspect of the present invention provides a method for operating a Raman pump unit to suppress four-wave mixing interaction between pump modes and data signals. The method includes: generating a pump signal and applying a wavelength-dependent phase shift to the pump signal.

A second aspect of the present invention provides a Raman pump unit including: a pump signal source that outputs a pump signal and a dispersion application unit that introduces a frequency-dependent phase shift to the pump signal.

A third aspect of the present invention provides a Raman amplification system. The Raman amplification system includes a Raman pump unit that generates a pump signal and a fiber into which the pump signal is injected in a direction of propagation of a signal to be amplified. The Raman pump unit includes: a pump signal source that outputs the pump signal and a dispersion application unit that introduces a frequency-dependent phase shift to the pump signal.

Further understanding of the nature and advantages of the inventions herein may be realized by reference to the remaining portions of the specification and the attached drawings.

DESCRIPTION OF SPECIFIC EMBODIMENTS

One application of the present invention is a WDM transmission link that employs distributed Raman amplification. In particular, one embodiment of the present invention facilitates the use of bi-directional pumping, i.e., a combination of co-propagating and counter-propagating Raman pumping. This provides improved OSNR (optical signal to noise ratio) performance, as compared to systems relying entirely on counter-propagating Raman pumping.

Moreover, the use of co-propagating Raman amplification allows a reduction in transmission power per channel and closer spacing of WDM channels.

Figure 1:
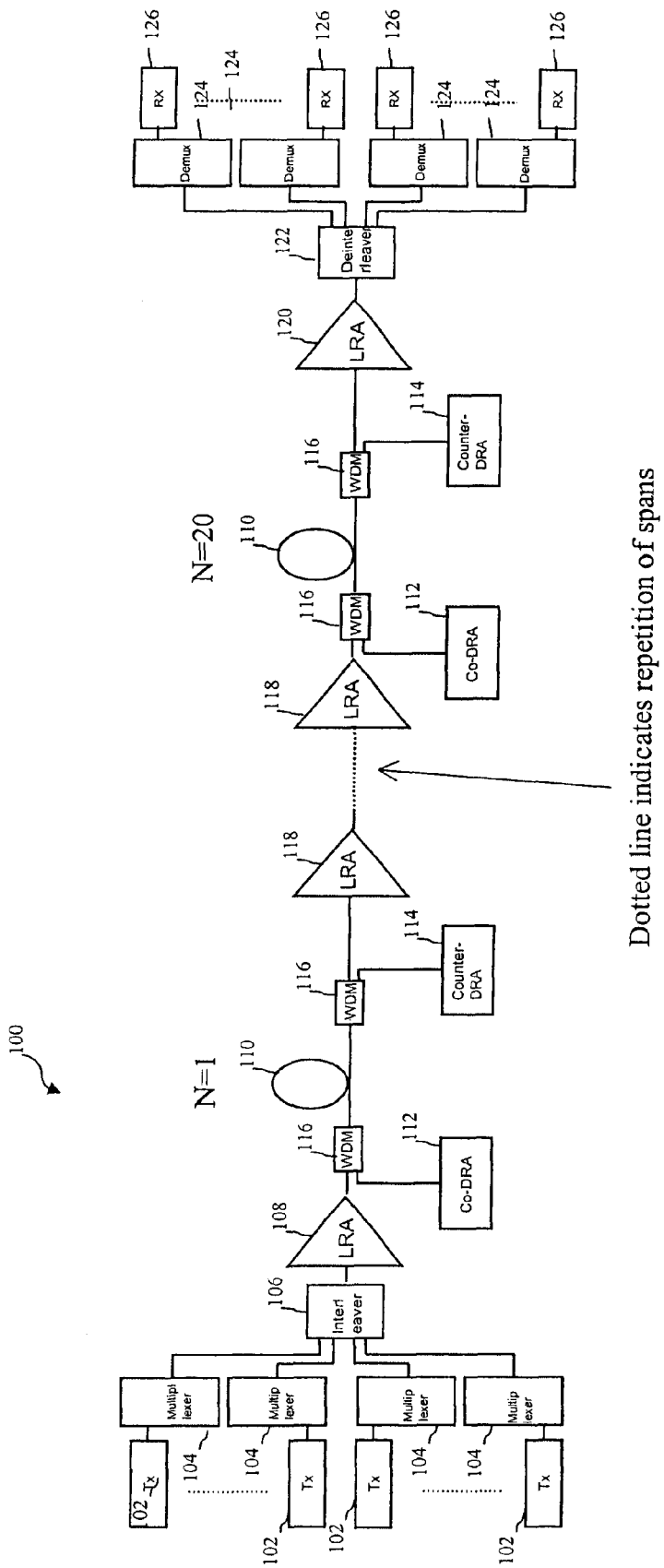
FIG. 1 depicts a representative WDM link to which the present invention may be applied.

FIG. 1 depicts such a representative WDM transmission system. WDM transmission system 100, as depicted, carries 200 WDM channels spaced 25 GHz apart. The channels fall within a wavelength range between 1568.16 and 1610.06 nm. These parameters are of course merely representative. Each transmission channel may carry, e.g., a 10 Gbps data signal.

The individual channels are generated by a series of transmitters 102 each operating at an assigned wavelength. A series of multiplexers 104 combines the 200 transmitter outputs into four composite WDM signals, each carrying 50 channels spaced 100 GHz apart. An interleaver 106 then combines the four multiplexer outputs to develop the 200-channel 25 GHz spacing WDM signal to be transmitted down the link. A discrete Raman amplifier 108 provides initial amplification prior to transmission down the link.

The link is divided into a number of spans. A representative link has 20 spans, each having a reach of 100 Km and imposing 22 dB of loss. Although only two spans are depicted in FIG. 1, the dotted lines indicate that the illustrated structure may repeat itself for numerous spans. Each span includes a transmission fiber 110. Transmission fibers 110 may be, e.g., TW-RS fibers, E-LEAF fibers, etc. To provide distributed Raman amplification within transmission fibers 110, each transmission fiber is provided with a co-propagating pump unit 112 and a counter-propagating Raman pump unit 114. The pump signals are introduced into transmission fibers 110 by use of wavelength division multiplexers 116. Lumped Raman amplifiers 118 provide further amplification between the spans. Much of the discussion in the present application will concern the internal structure of co-propagating pump unit 112 and how it may be enhanced to improve suppression of four-wave mixing crosstalk between pump modes and signals.

At the receiver end, preamplification is provided by a lumped Raman amplifier 120. The 200-channel WDM signal is deinterleaved into four 50-channel 100 GHz spacing signals by a deinterleaver 122. Demultiplexers 124 separate the 50 channel signals into single channel components. Receivers 126 recover the transmitted data for each channel. The target OSNR at the input to receivers 126 is 12 dB as measured using 0.5 nm resolution bandwidth.

Figure 2:
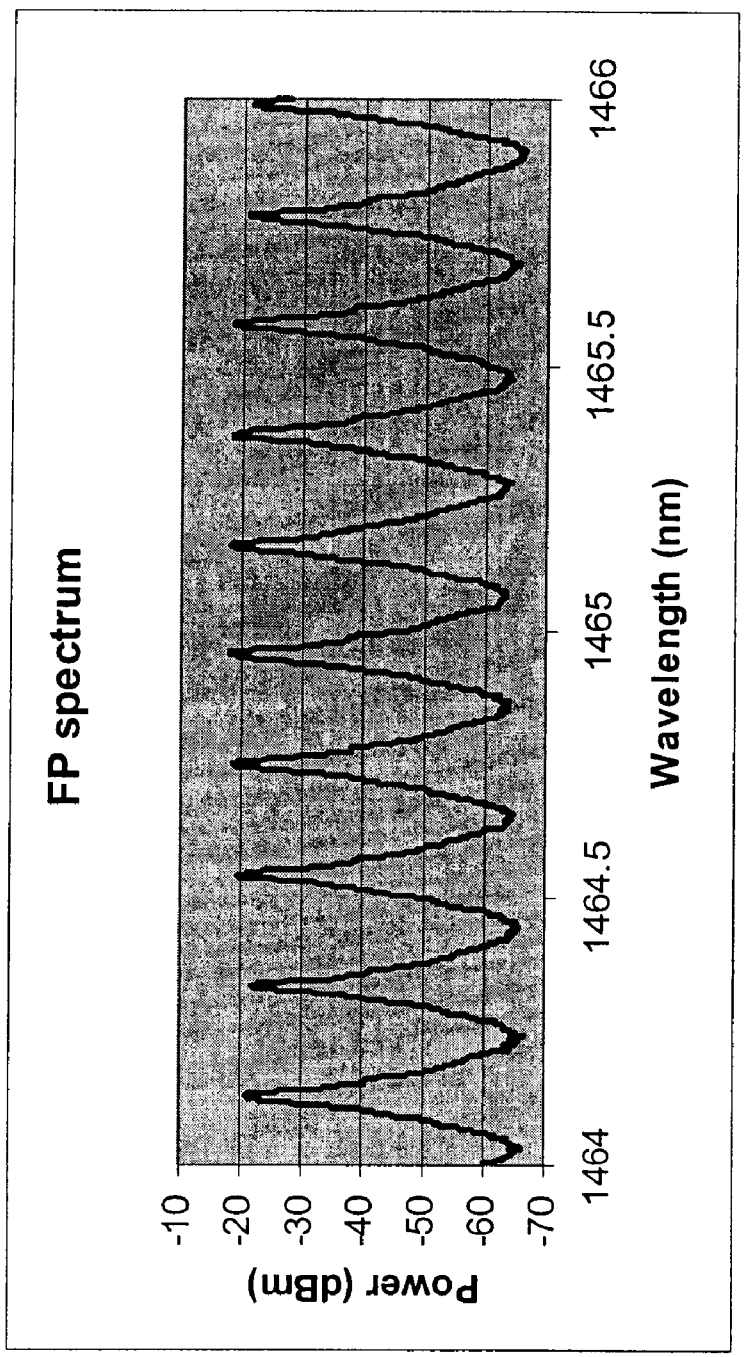
FIG. 2 depicts the output spectrum of a Fabry-Perot laser pump source.

It is beneficial to employ Fabry-Perot lasers to implement co-propagating pump units 112. The Fabry-Perot lasers provide the necessary co-propagating Raman pump energy at relatively low cost and with sufficiently low RIN to accommodate co-propagating pumping Raman amplification. Also, Fabry-Perot pump sources do not require complex implementation of dithering tone techniques to achieve the SBS (Stimulated Brillouin Scattering) suppression required by DFB based pump sources. Although, ideally, the laser output would be a single spectral peak, an actual Fabry-Perot laser has several longitudinal modes with peaks spaced 0.2–0.3 nm apart. FIG. 2 depicts a typical output spectrum for a Fabry-Perot laser centered at 1465 nm. The interaction between these multiple peaks and the WDM signal can give rise to exacerbated four-wave mixing crosstalk effects.

Figure 3:
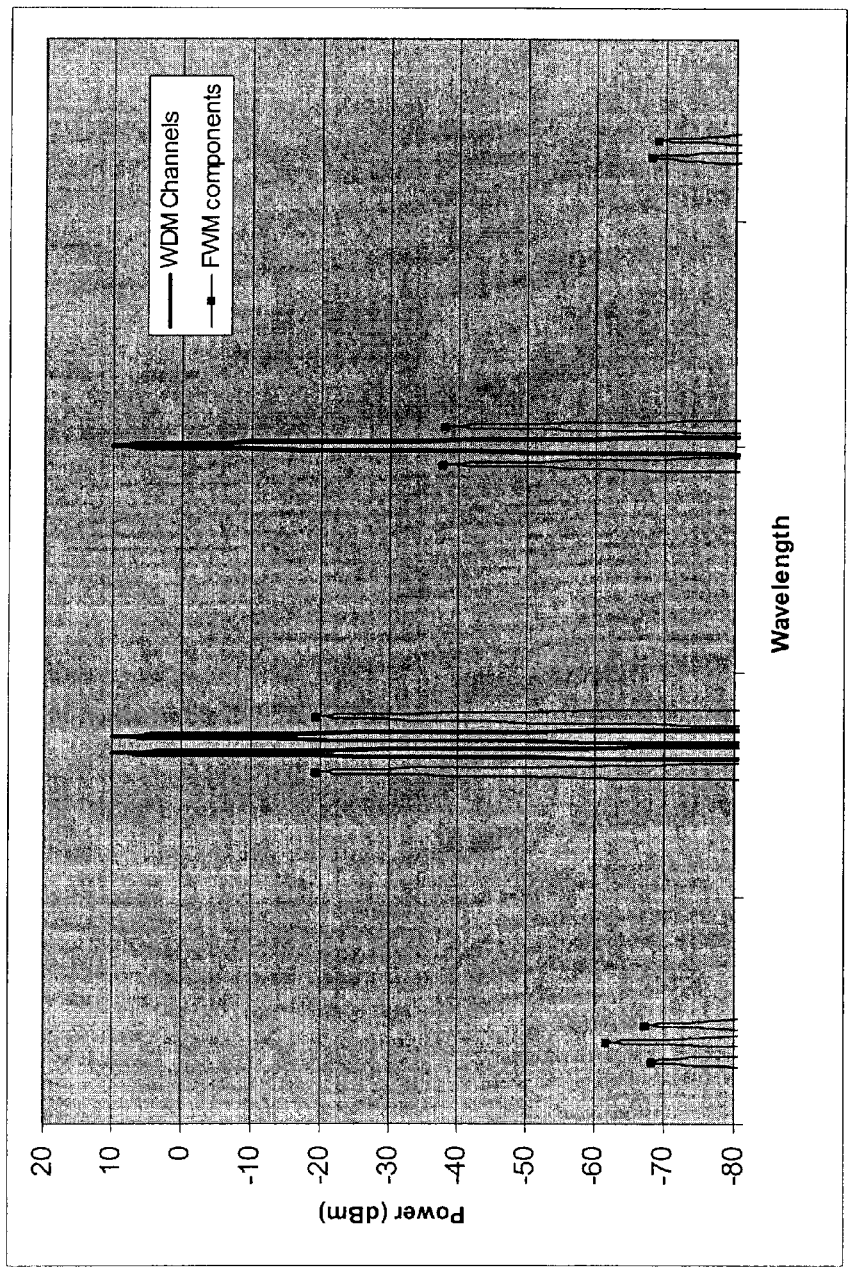
FIG. 3 depicts four-wave mixing interaction among three unequally spaced wavelength-multiplexed signals.

FIG. 3 depicts four-wave mixing crosstalk effects for a simplified transmission system employing three unequally spaced wavelength-multiplexed signals. It can be seen that there are 9 four-wave mixing product components, of which two are adjacent to the highest wavelength signal.

Figure 4:
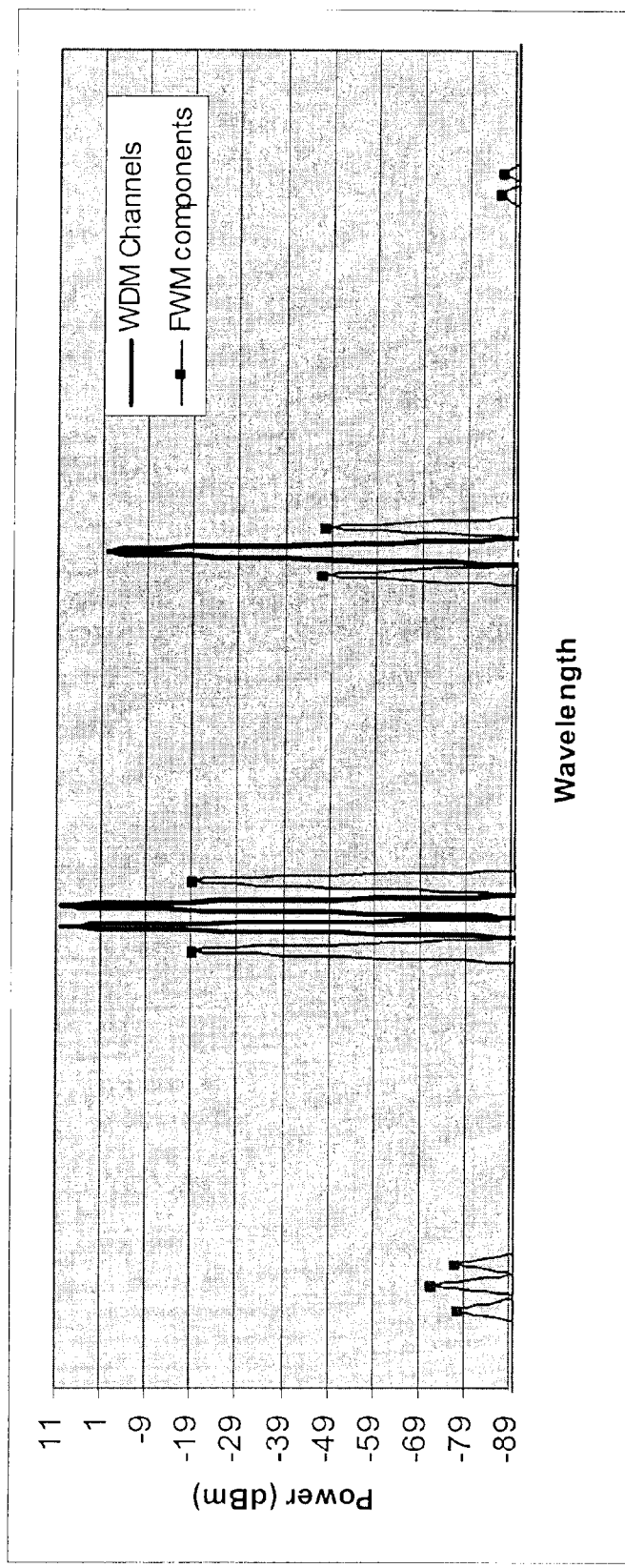
FIG. 4 depicts how the scenario of FIG. 3 is affected by reducing the power of one of the three signals by 10 dB.

Focusing on the two four-wave mixing products that are adjacent to the highest wavelength signal, it should be appreciated that the ratio between signal power and four-wave mixing product power is independent of signal power. This is illustrated by FIG. 4 were signal power has been reduced by 10 dB and the ratio between signal power and adjacent four-wave mixing product power is preserved. Thus the four-wave mixing crosstalk induced by a pump on a data signal depends on the pump power and not on the data signal power.

Figure 5A:
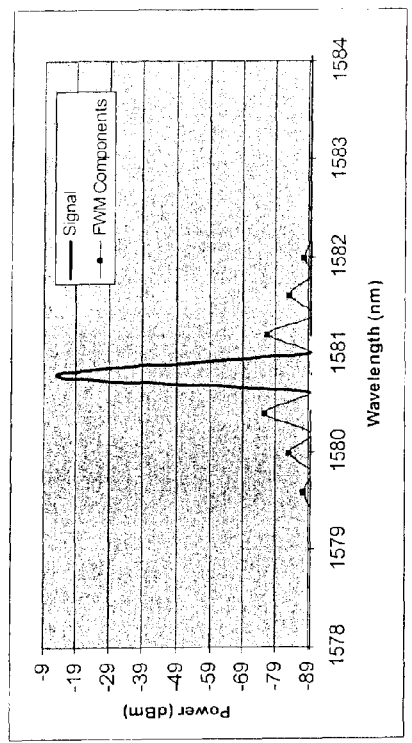
FIGS. 5A–5C depict the four-wave mixing interactions between various numbers of Fabry-Perot pump modes and a single WDM channel.
Figure 5B:
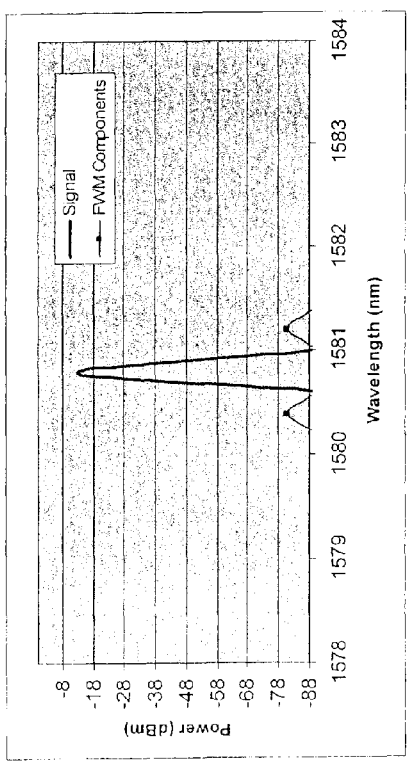
Figure 5C:
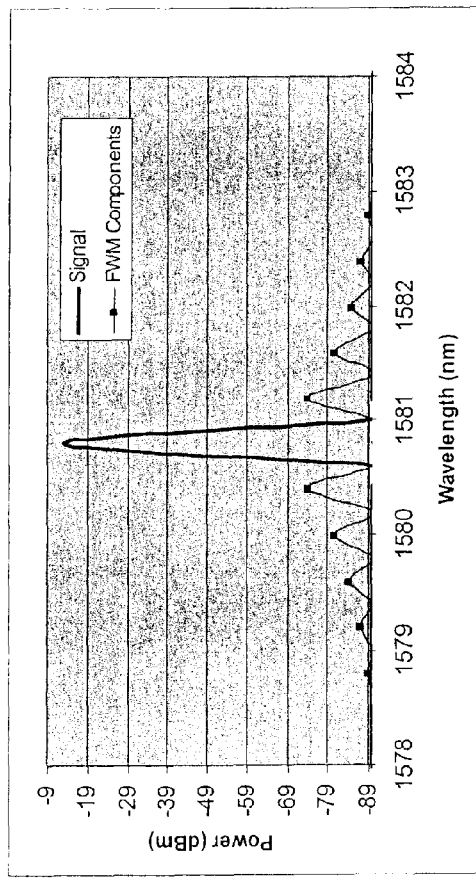

In reality, Fabry-Perot lasers have several equally spaced longitudinal modes thus giving rise to a more complex four-wave mixing interaction with the WDM channels. FIGS. 5A–5C show the four-wave mixing crosstalk effects for a single WDM channel at 1580 nm where a co-propagating laser pump source at 1460 nm has various numbers of modes. FIG. 5A shows the four-wave mixing crosstalk components where the pump signal has two modes, while in FIG. 5B the pump signal has four modes, and in FIG. 5C the pump signal has six modes.

Figure 6:
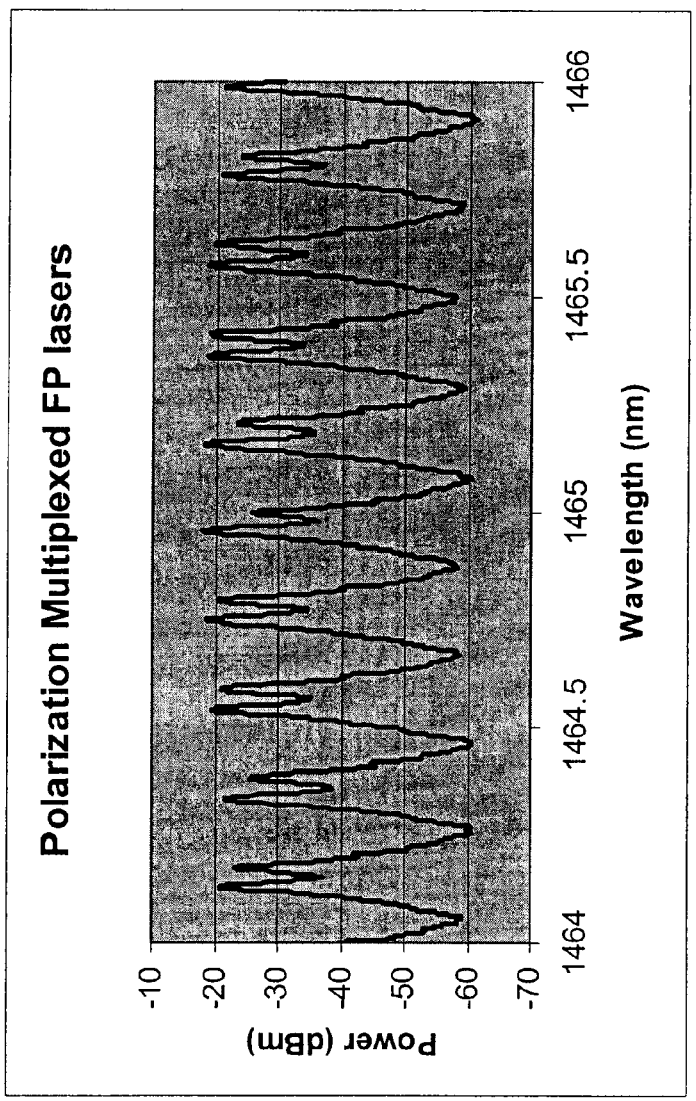
FIG. 6 depicts the output spectrum of two polarization-multiplexed Fabry-Perot lasers operating at the same wavelength.

A further complication arises in that in many typical pump units, two Fabry-Perot lasers at the same wavelength are polarization-multiplexed together to provide a single pump wavelength signal. This is done to avoid polarization-dependent Raman gain effects. FIG. 6 depicts the output spectrum for two polarization-multiplexed Fabry-Perot lasers, each centered at 1465 nm. It can be seen that the longitudinal modes of the two lasers are not perfectly aligned in the wavelength domain. This effectively increases the number of modes that can interact with signals to give rise to four-wave mixing crosstalk effects. However the two sets of orthogonal modes operate substantially independently in giving rise to four-wave mixing crosstalk with signals. This is because the two sets of modes maintain their orthogonality along the transmission fiber and thus do not interact despite their slight misalignment in wavelength.

Figure 7:
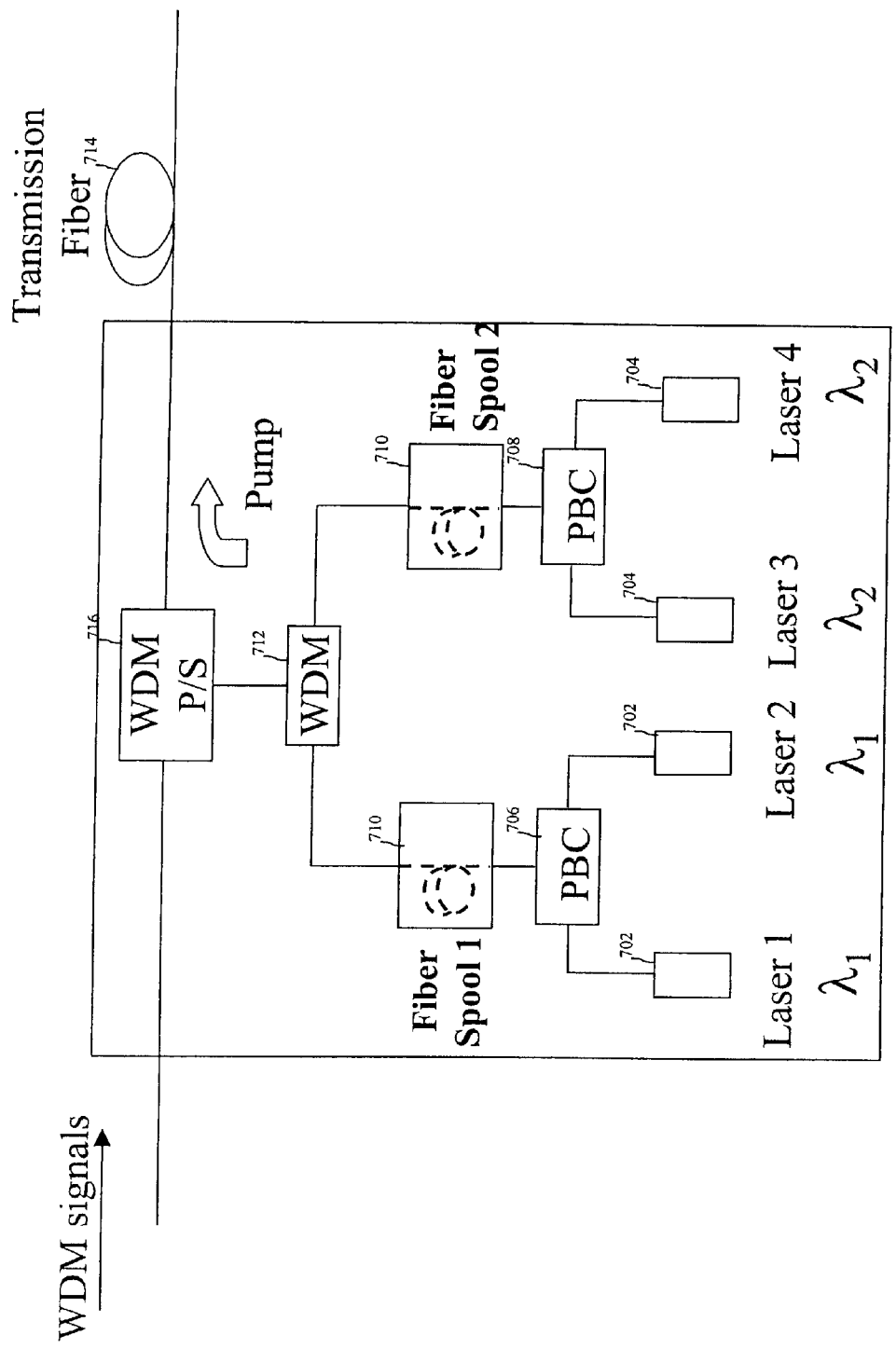
FIG. 7 depicts a Raman pump unit according to one embodiment of the present invention.

FIG. 7 depicts a Raman pump unit configuration that suppresses four-wave mixing crosstalk according to one embodiment of the present invention. The configuration is illustrated for two co-propagating pump wavelengths, but it will be appreciated that the number of wavelengths is merely representative and that any number of wavelengths or a single wavelength may be employed. There are two lasers 702 at wavelength $\lambda_1$ and two lasers 704 at wavelength $\lambda_2$. For wavelength $\lambda_1$, a polarization beam combiner 706 combines and orthogonalizes the outputs of laser 702. A polarization beam combiner 708 performs the same function for $\lambda_2$. Alternatively, a single higher power laser can be used on each wavelength in conjunction with a depolarizer such as a Lyot depolarizer as known in the art.

According to one embodiment of the present invention, four-wave mixing crosstalk effects caused by the copropagating pump energy are reduced by imposing a wavelength-dependent phase shift, e.g., chromatic dispersion, on the pump signals. This can be done in a variety of ways. For example, dispersion compensating fiber may be used to introduce the desired chromatic dispersion. Alternatively, e.g., a dispersion compensating grating may be used.

The effect of the chromatic dispersion imposed on the pump signals is to decorrelate the phases among the multiple laser transmission modes. The decorrelation of these phases greatly reduces four-wave mixing crosstalk.

In FIG. 7, fiber spools 710 impose the required chromatic dispersion. Fiber spools 710 may include dispersion compensating fiber. The minimum dispersion at the pump wavelength that should be imposed on each pump signal within the pump module is preferably either greater than 10 ps/nm and lower than 80 ps/nm or less than −10 ps/nm and greater than −80 ps/nm. In FIG. 7, the two pump signals are combined by a multiplexer 712 and injected into a transmission fiber 714 by use of a pump/signal wavelength division multiplexer 716.

To illustrate the four-wave mixing crosstalk suppression effect of the system of FIG. 7, three different co-propagating distributed Raman amplification configurations have been studied. For all three configurations, the same pump powers are employed on two pump wavelengths centered at 1460 nm and 1500 nm. The signal to be amplified is an 80 channel 25 GHz spaced WDM signal with an input power level of −13 dBm per channel. The transmission system being considered employs 80 Km of TW-RS transmission fiber.

In a first configuration presented for comparison, attenuators are used where the present invention would impose chromatic dispersion on the pump signals. One attenuator is used for each pump wavelength between the polarization beam combiner and the pump wavelength division multiplexer. In the second configuration, spools of dispersion compensating fiber are used to impose chromatic dispersion on the pump signals as shown in FIG. 7. For each pump wavelength, one dispersion compensating fiber spool is introduced between the polarization beam combiner and the pump wavelength division multiplexer. The spools are 2 Km long each and introduce about −60 ps/nm/Km of chromatic dispersion at 1460 nm. Similar results were obtained using spools 2.5 Km long each of SMRF fiber, as known in the art, having about 10 ps/nm/Km of chromatic dispersion at the pump wavelength. In the third configuration each spool consists of 3.5 Km of TW-RS fiber.

Figures 8A, 8B:
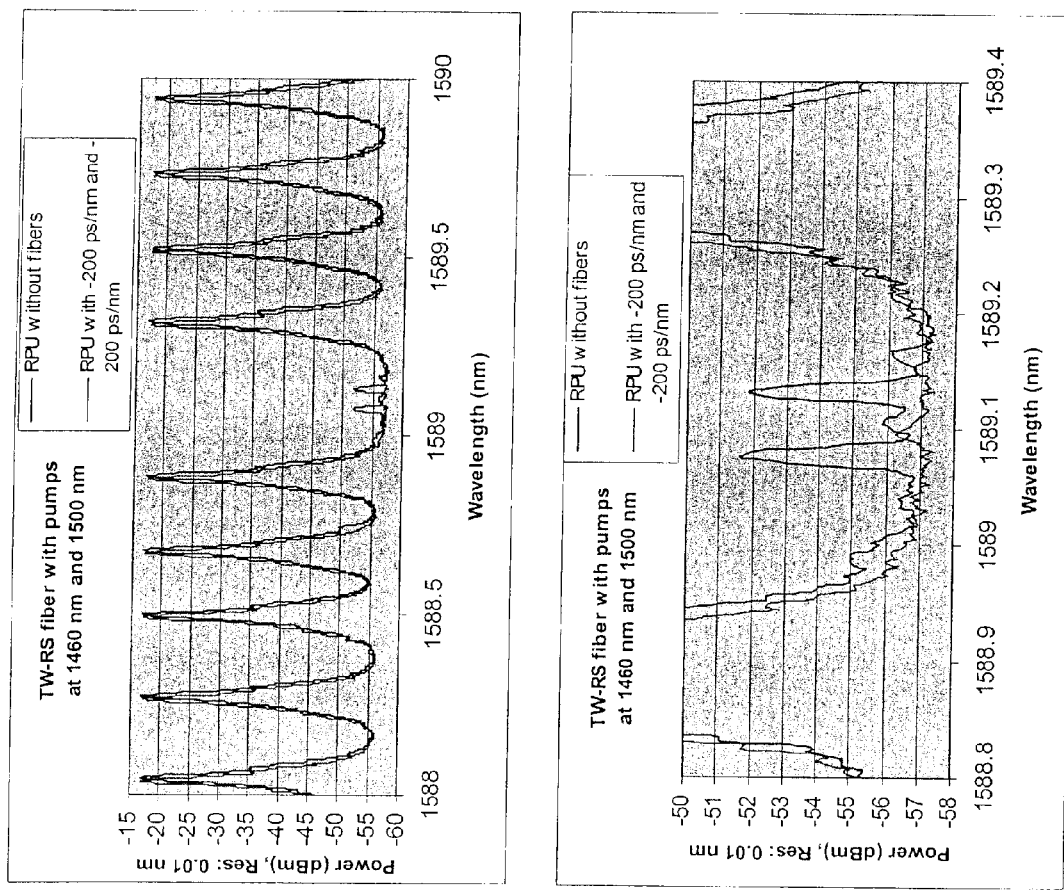
FIGS. 8A–8B depict four-wave mixing crosstalk suppression performance in a WDM link incorporating TW-RS transmission fiber that employs dispersion compensating fiber to impose a wavelength-dependent phase shift on the co-propagating pump source according to one embodiment of the present invention.

FIGS. 8A–8B compare the four-wave mixing products for cases 1 and 2. In FIGS. 8A–8B, the WDM channel at 1589 nm has been switched off to facilitate inspection of the four-wave mixing products adjacent to that wavelength. FIG. 8A shows a general view of the output spectrum between 1588 nm and 1590 nm. Two four-wave mixing products can be seen above 1589 nm in the configuration 1 spectrum while they are largely absent in the configuration 2 spectrum. FIG. 8B depicts a magnified view of the spectrum surrounding the four-wave mixing products. It can be seen that the use of the dispersion compensating fiber in the Raman pump unit greatly attenuates the undesired four-wave mixing products. The suppression is approximately 10 dB without any modification of the Raman gain. The crosstalk caused by the interaction of the pump modes is now suppressed below the crosstalk generated by interaction among the WDM channels themselves.

Figure 9A:
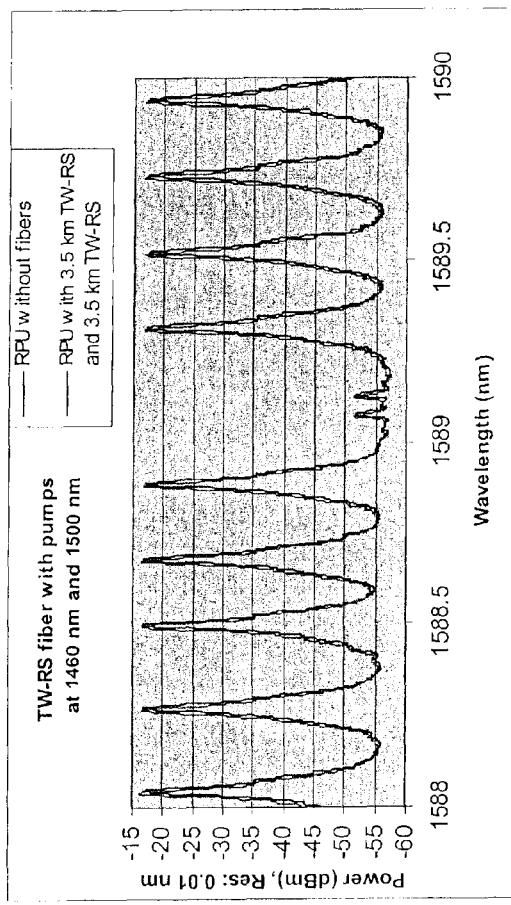
FIGS. 9A–9B depict four-wave mixing crosstalk suppression performance in a WDM link employing TW-RS transmission fiber where fiber spools are substituted for dispersion compensating fiber.
Figure 9B:
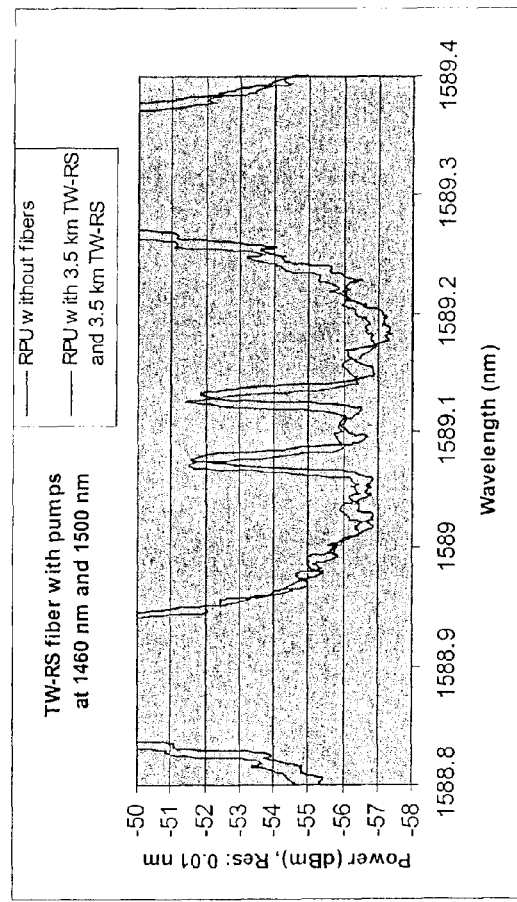

FIGS. 9A–9B compare the output spectra for configurations 1 and 3. Again, the WDM channel at 1589 nm has been switched off to allow inspection of the four-wave mixing products in the vicinity of that channel. FIG. 9A shows the output spectrum between 1588 and 1590 nm while FIG. 9B shows a magnified view of the four-wave mixing products. It can be seen that there is relatively little suppression of the four-wave mixing products in this scenario because insufficient chromatic dispersion has been imposed on the pump signals.

In an alternative example scenario, E-LEAF fiber is used as the transmission fiber and a single pump wavelength of 1500 nm is used to inject co-propagating pump energy. The link carries 80 channels spaced 25 GHz apart and having a power level of −13 dBm per channel. A Raman pump module such as the one in FIG. 7 is employed. However, there is only one pump wavelength and therefore a single polarization beam combiner to combine the outputs of only two lasers.

In a first configuration presented for comparison, attenuation follows the polarization beam combiner rather than any dispersion compensation unit. In another configuration according to one embodiment of the present invention, a spool of dispersion compensating fiber is inserted between the polarization beam combiner and the pump/signal multiplexer. The spool has 2 Km of fiber having a chromatic dispersion of about −70 ps/nm/Km at 1500 nm.

Figure 10:
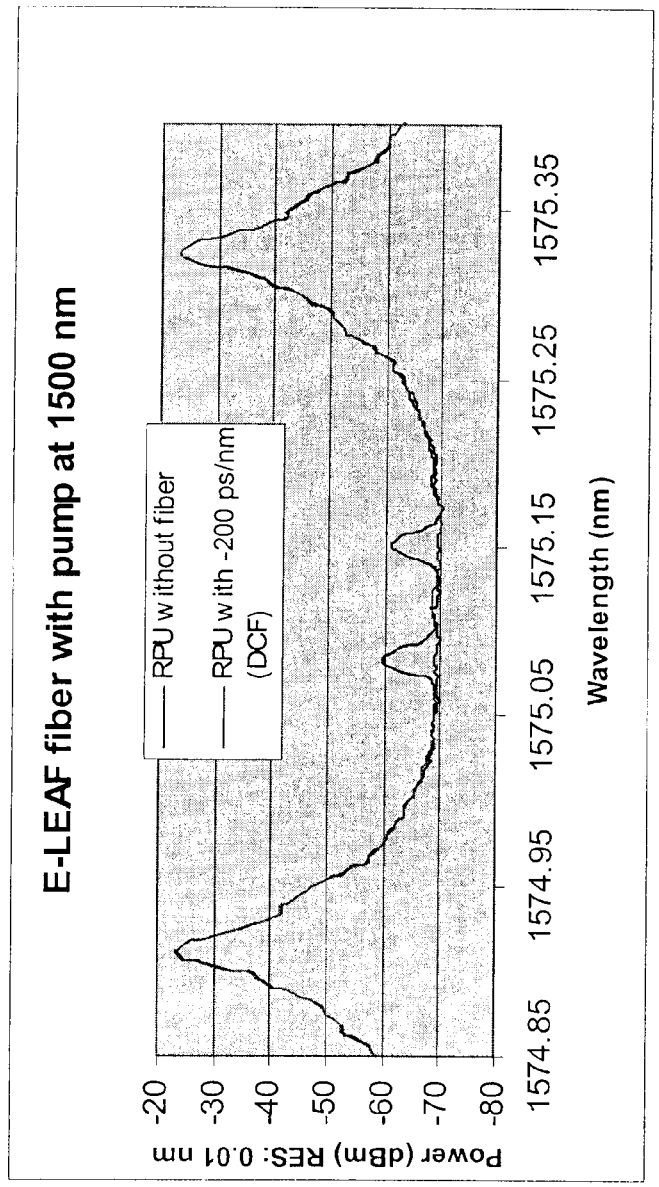
FIG. 10 depicts four-wave mixing crosstalk suppression performance in a WDM link incorporating E-LEAF transmission fiber that employs dispersion compensating fiber to impose a wavelength-dependent phase shift on a co-propagating pump source according to one embodiment of the present invention.

FIG. 10 compares the four-wave mixing products results for these two configurations. The channel at 1575 nm has been turned off to facilitate inspection of the four-wave mixing products. The Raman gain is approximately 6 dB. It can be seen that four-wave mixing between pump modes and signals is effectively suppressed by the use of the dispersion compensating fiber in the pump path.

It has been shown that four-wave mixing crosstalk between co-propagating pump laser sources and WDM channels can be greatly suppressed. This allows the optical transmission system designer to capture the advantages of co-propagating pumping without incurring penalties due to four-wave mixing crosstalk between pump modes and WDM channels. With the resulting improvement of OSNR, greater optical transmission distances and higher data rates may be achieved.

Furthermore, introducing chromatic dispersion in the pump signal path will typically not require imposition of more than 0.7 dB of insertion loss and therefore will not significantly increase required pump power. Also, by accommodating the multiple mode characteristic of Fabry-Perot lasers, the present invention facilitates their use, thus increasing reliability and reducing cost while exploiting their low RIN and low degree of polarization.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for operating a Raman pump unit to suppress four-wave mixing interaction between pump modes and data signals, said method comprising:

generating a pump signal; and applying a wavelength-dependent phase shift to said pump signal.

2. The method of claim 1 further comprising:

after application of said wavelength-dependent phase shift, injecting said pump signal into a fiber to induce Raman amplification, wherein four-wave mixing effects are reduced due to said wavelength-dependent phase applied to said pump signal.

3. The method of claim 1 wherein applying said wavelength-dependent phase shift comprises:

passing said pump signal through chromatic dispersion compensating fiber.

4. The method of claim 1 wherein applying said wavelength-dependent phase shift comprises:

passing said pump signal through fiber having non-zero chromatic dispersion at a wavelength of said pump signal.

5. The method of claim 1 wherein applying said wavelength-dependent phase shift comprises:

passing said pump signal through a chromatic dispersion compensating grating.

6. The method of claim 1 wherein generating said pump signal comprises:

generating first coherent optical pump energy at a selected wavelength;

generating second coherent optical pump energy at said selected wavelength and with polarization orthogonal to that of said first coherent optical pump energy; and polarization multiplexing s aid first coherent optical pump energy and said second coherent optical pump energy to form said second pump signal.

7. A Raman pump unit comprising:

a pump signal source that outputs a pump signal; and a dispersion application unit that introduces a frequency-dependent phase shift to said pump signal.

8. The Raman pump unit of claim 7 wherein said dispersion application unit comprises:

chromatic dispersion compensating fiber.

9. The Raman pump unit of claim 7 wherein said dispersion application unit comprises a chromatic dispersion compensating grating.

10. The Raman pump unit of claim 7 wherein said pump source comprises:

a first laser that generates coherent optical energy on a selected wavelength;

a second laser that generates coherent optical energy on said selected wavelength, wherein said coherent optical energy generated by said first laser is polarized orthogonally relative to said coherent optical energy generated by said first laser; and a polarization multiplexer that combines said coherent optical energy generated by said first laser and coherent optical energy generated by said second laser to form said pump signal.

11. The Raman pump unit of claim 7 wherein said pump source comprises a single depolarized laser source.

12. A Raman amplification system comprising:

a Raman pump unit comprising:

a pump signal source that outputs a pump signal; and a dispersion application unit that introduces a frequency-dependent phase shift to said pump signal; and a fiber into which said pump signal is injected in a direction of propagation of a signal to be amplified.

13. The Raman amplification system of claim 12 wherein said dispersion application unit comprises:

chromatic dispersion compensating fiber.

14. The Raman amplification system of claim 12 wherein said dispersion application unit comprises:

fiber having non-zero chromatic dispersion at a wavelength of said pump signal.

15. The Raman amplification system of claim 12 wherein said dispersion application unit comprises a chromatic dispersion compensating grating.

16. The Raman amplification system of claim 12 wherein said pump signal source comprises:

a first Fabry-Perot laser that generates coherent optical energy on a selected wavelength;

a second Fabry-Perot laser that generates coherent optical energy on said selected wavelength, wherein said coherent optical energy generated by said first laser is polarized orthogonally relative to said coherent optical energy generated by said first laser; and a polarization multiplexer that combines said coherent optical energy generated by said first Fabry-Perot laser and coherent optical energy generated by said second Fabry-Perot laser to form said pump signal.

17. The Raman amplification system of claim 12 wherein said pump signal source comprises a single depolarized laser.

18. The Raman amplification system of claim 12 further comprising a pump multiplexer for combining said pump signal with other pump signals prior to injection into said fiber.

19. Apparatus for operating a Raman pump unit to suppress four-wave mixing interaction between pump modes and data signals, said method comprising:

means for generating a pump signal; and means for applying a wavelength-dependent phase shift to said pump signal.

20. The apparatus of claim 19 further comprising:

means for, after application of said wavelength-dependent phase shift, injecting said pump signal into a fiber to induce Raman amplification, wherein four-wave mixing effects are reduced due to said wavelength-dependent phase applied to said pump signal.

21. The apparatus of claim 19 wherein said means for applying said wavelength-dependent phase shift comprises:

means for passing said pump signal through chromatic dispersion compensating fiber.

22. The apparatus of claim 19 wherein said means for applying said wavelength-dependent phase shift comprises:

means for passing said pump signal through fiber having non-zero chromatic dispersion at a wavelength of said pump signal.

23. The apparatus of claim 19 wherein said means for applying said wavelength-dependent phase shift comprises:

means for passing said pump signal through a chromatic dispersion compensating grating.

24. The apparatus of claim 19 wherein said means for generating said pump signal comprises:

means for generating first coherent optical pump energy at a selected wavelength;

means for generating second coherent optical pump energy at said selected wavelength and with polarization orthogonal to that of said first coherent optical pump energy; and means for polarization multiplexing said first coherent optical pump energy and said second coherent optical pump energy to form said second pump signal.

* * * * *